US011348456B2

(12) United States Patent
Ghannam et al.

(10) Patent No.: US 11,348,456 B2
(45) Date of Patent: May 31, 2022

(54) SYSTEMS AND METHODS FOR DETECTING WRONG WAY TRAVEL OF A VEHICLE (71) Applicant: Ford Global Technologies, LLC, Dearborn, MI (US)

(72) Inventors: Mahmoud Yousef Ghannam, Canton, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/064,151

(22) Filed: Oct. 6, 2020

(65) Prior Publication Data
US 2022/0108605 A1    Apr. 7, 2022

(51) Int. Cl.
*G08G 1/056*   (2006.01)
*G01S 19/51*   (2010.01)
*B60Q 9/00*    (2006.01)
*G01C 21/36*   (2006.01)

(52) U.S. Cl.
CPC .............. *G08G 1/056* (2013.01); *B60Q 9/00* (2013.01); *G01C 21/3661* (2013.01); *G01S 19/51* (2013.01)

(58) Field of Classification Search
CPC ...... G08G 1/056; B60Q 9/00; G01C 21/3661; G01S 19/51
See application file for complete search history.

(56) References Cited

U.S. PATENT DOCUMENTS

| 7,979,173 | B2 | 7/2011 | Breed |
| 8,818,725 | B2 | 8/2014 | Ricci |
| 9,429,943 | B2 | 8/2016 | Wilson et al. |
| 2018/0113453 | A1* | 4/2018 | Ceylan ................. G05D 1/0246 |
| 2019/0266893 | A1* | 8/2019 | Sambo .................. G08G 1/015 |

(Continued)

FOREIGN PATENT DOCUMENTS

| CN | 106314438 A | 1/2017 |
| WO | 2017211492 A1 | 12/2017 |

OTHER PUBLICATIONS

Letstrack, "Some Reasons why you should Track your Employees," Mar. 7, 2019 (64 pages).

(Continued)

*Primary Examiner* — Mathew Franklin Gordon
(74) *Attorney, Agent, or Firm* — Brandon Hicks; Eversheds Sutherland (US) LLP (57) ABSTRACT

The disclosure is generally directed to systems and methods for detecting wrong way travel of a vehicle. In one example method, a smart device is provided in a vehicle. The smart device may be, for example, a smartphone of an occupant of the vehicle. A GPS system can be used to identify sequential location coordinates of the vehicle as the vehicle travels on a road, such as for example, a multi-lane road. The sequential location coordinates can be used to determine a direction of travel of the vehicle. The smartphone may access a database in order to obtain road rules pertaining to the multi-lane road. The road rules provide information regarding a legitimate direction of travel for vehicles in each of multiple lanes and can be used by the smartphone to determine whether the vehicle is traveling in a wrong direction on the multi-lane road.

18 Claims, 7 Drawing Sheets

(56) References Cited

U.S. PATENT DOCUMENTS

2021/0174671 A1\* 6/2021 Borras .................. G08G 1/127

OTHER PUBLICATIONS

Bosch Mobility Solutions, "Cloud-based wrong-way driver warning" (8 pages).
Chloe Olewilz, "Brain4Cars analyzes driving behavior with AI to predict and prevent road accidents," Digital Trends, Oct. 14, 2015 (15 pages).

\* cited by examiner

SYSTEMS AND METHODS FOR DETECTING WRONG WAY TRAVEL OF A VEHICLE

FIELD OF THE DISCLOSURE

This disclosure generally relates to vehicles, and more particularly relates to detecting wrong way travel of a vehicle.

BACKGROUND

Wrong way driving occurs when a driver drives a vehicle in a direction that is opposite to normal traffic flow. In some cases, the driver may be in an intoxicated condition, while in some other cases, the driver may be fleeing from law enforcement officials or be unaware of traffic rules such as, for example, driving on the left side of a road in some countries and on the right side of the road in other countries. Wrong way driving may often lead to collisions.

Some efforts have been made to detect wrong way driving such as, for example, by the use of roadside cameras that monitor traffic flow to detect an errant behavior, and by the use of cameras mounted in a vehicle. Images captured by the cameras mounted in a vehicle may be processed by an onboard computer for identifying certain objects (such as traffic lights and roadside signs) that provide an indication that the vehicle is being driven in the wrong direction on a road.

However, such traditional efforts can be expensive to implement and/or a typical driver may opt not to install equipment for purposes of detecting wrong way driving because the typical driver does not expect that he/she will drive the wrong way. It would therefore be desirable to provide wrong way detection solutions that can be implemented using hardware that is already in use ubiquitously by many people for various other purposes.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are directed to systems and methods for detecting wrong way travel of a vehicle. In one example embodiment, a smart device is provided in a vehicle. The smart device can be, for example, a smartphone that is carried by an occupant of the vehicle or an infotainment system installed in the vehicle. A GPS system of the smartphone or the infotainment system can be used to identify sequential location coordinates of the vehicle as the vehicle travels on a road. The sequential location coordinates can be utilized to determine a direction of travel of the vehicle on the road. The smartphone or infotainment system may access a database that can be provided in the smartphone, the infotainment system, or a server computer, in order to obtain road rules pertaining to the road on which the vehicle is traveling. The road rules provide an indication of a legitimate direction of travel for vehicles on the road, such as, for example, in each lane of a multi-lane road. The smartphone or infotainment system can utilize the road rules and the direction of travel of the vehicle to determine whether the vehicle is traveling in a wrong direction on the road.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, words such as "traveling," "travel," "driving," "driven," and "moving" can be used interchangeably to describe the movement of a vehicle, and words such as "way" and "direction" can be used to indicate a direction in which the vehicle is moving. Similarly, the phrase "wrong way" and "wrong direction" can be used interchangeably to indicate a travel path that is in an opposite direction to a legitimate travel path. The travel path may be referred to herein as a "road." It must be understood that the word "road" refers to any surface on which a vehicle may be driven (paved or unpaved) such as, for example, a street, a lane, or an off-road surface. The phrase "GPS coordinates" as used herein refers to defining a location based on a combination of a longitude value and a latitude value. The phrase "location coordinate" may refer not only to a GPS coordinate but to other forms of specifying locations as well. It should also be understood that the word "example" as used herein is intended to be non-exclusionary and non-limiting in nature.

Figure 1:
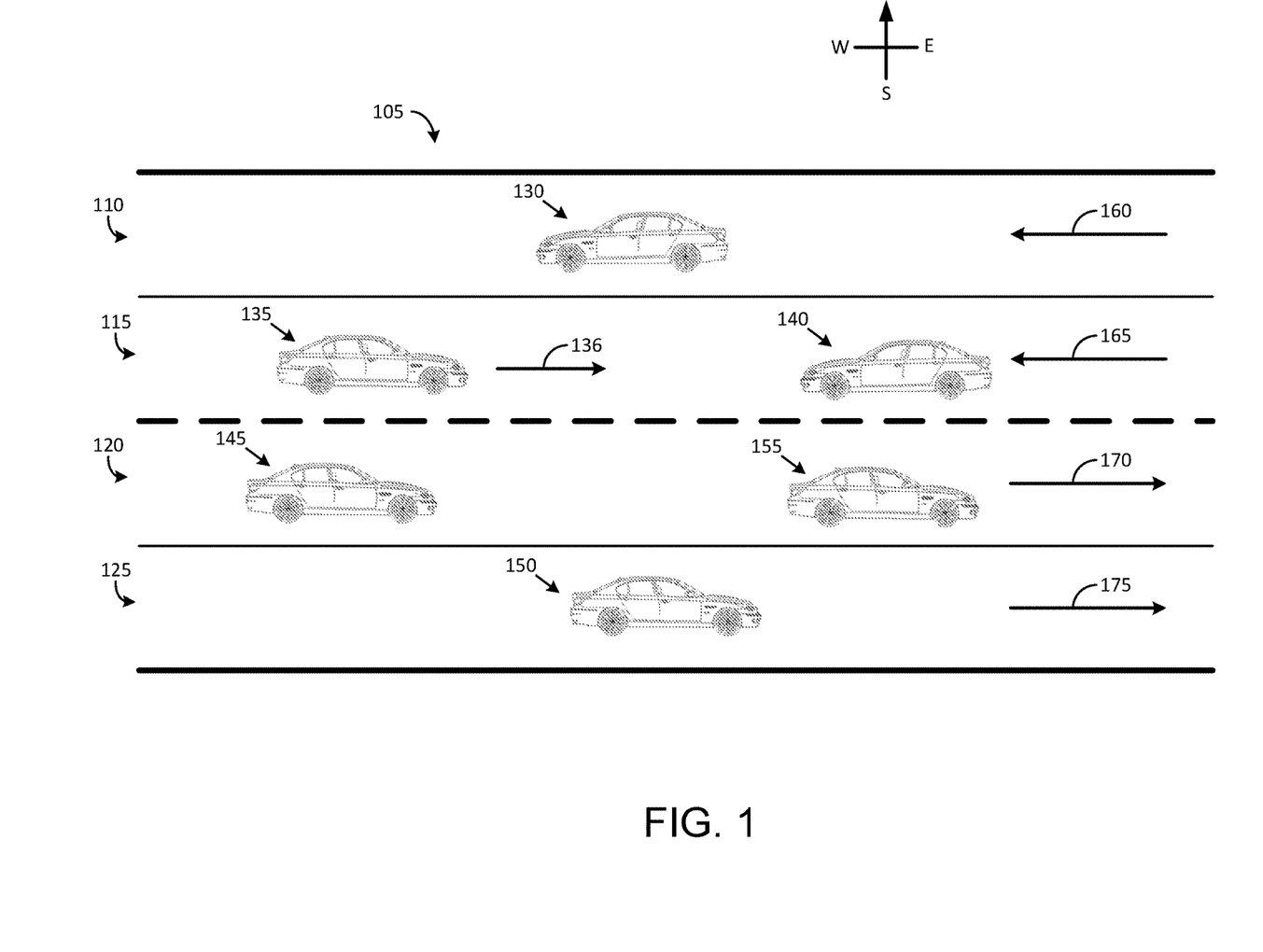
FIG. 1 illustrates an example scenario in which a vehicle is traveling in a wrong direction on a multi-lane road.

FIG. 1 illustrates an example scenario in which a vehicle 135 is traveling in a wrong direction on a multi-lane road 105. In one case, the vehicle 135 can be an autonomous vehicle that includes an infotainment system configured to cooperate with various components of the autonomous vehicle such as a GPS system, to detect wrong way travel of the vehicle 135. In another case, the vehicle 135 can be a driver-operated vehicle that includes a smartphone carried by the driver (or a passenger) of the vehicle 135. The smartphone is configured to detect wrong way travel of the vehicle 135.

The example multi-lane road 105 includes two lanes that are for use by vehicles traveling in a west-to-east direction and two lanes that are for use by vehicles traveling in an east-to-west direction. The legitimate direction of travel for vehicles in lane 125 is indicated by an arrow 175, in lane 120 by an arrow 170, in lane 115 by an arrow 165, and in lane 110 by an arrow 160. In this example scenario, a vehicle 150 is legitimately traveling in a west-to-east direction in lane 125 and two vehicles (vehicle 145 and vehicle 155) are legitimately traveling in a west-to-east direction in lane 120. In the opposite direction, a vehicle 130 is legitimately traveling in an east-to-west direction in lane 110 and another vehicle 140 is also legitimately traveling in an east-to-west direction in lane 115. However, the vehicle 135 is traveling along a travel path 136 in a wrong direction in lane 115 (west-to-east direction). A likelihood of a collision between the vehicle 135 and the vehicle 140 exists if the vehicle 135 persists in traveling the wrong way in lane 115. It is therefore desirable to alert the driver of the vehicle 135 about the wrong way driving and/or other drivers, such as a driver of the vehicle 140, of the potential danger posed by the wrong way driving.

The example scenario described above pertains to the multi-lane road 105. A similar scenario may be encountered on other roads such as, for example, a one-way road that is separated by a divider from another one-way road; or a two-way road where no divider is present and traffic moves in opposing directions on either side of a painted median line. The systems and methods described herein for detecting wrong way travel are equally applicable to these other roads as well.

Figure 2:
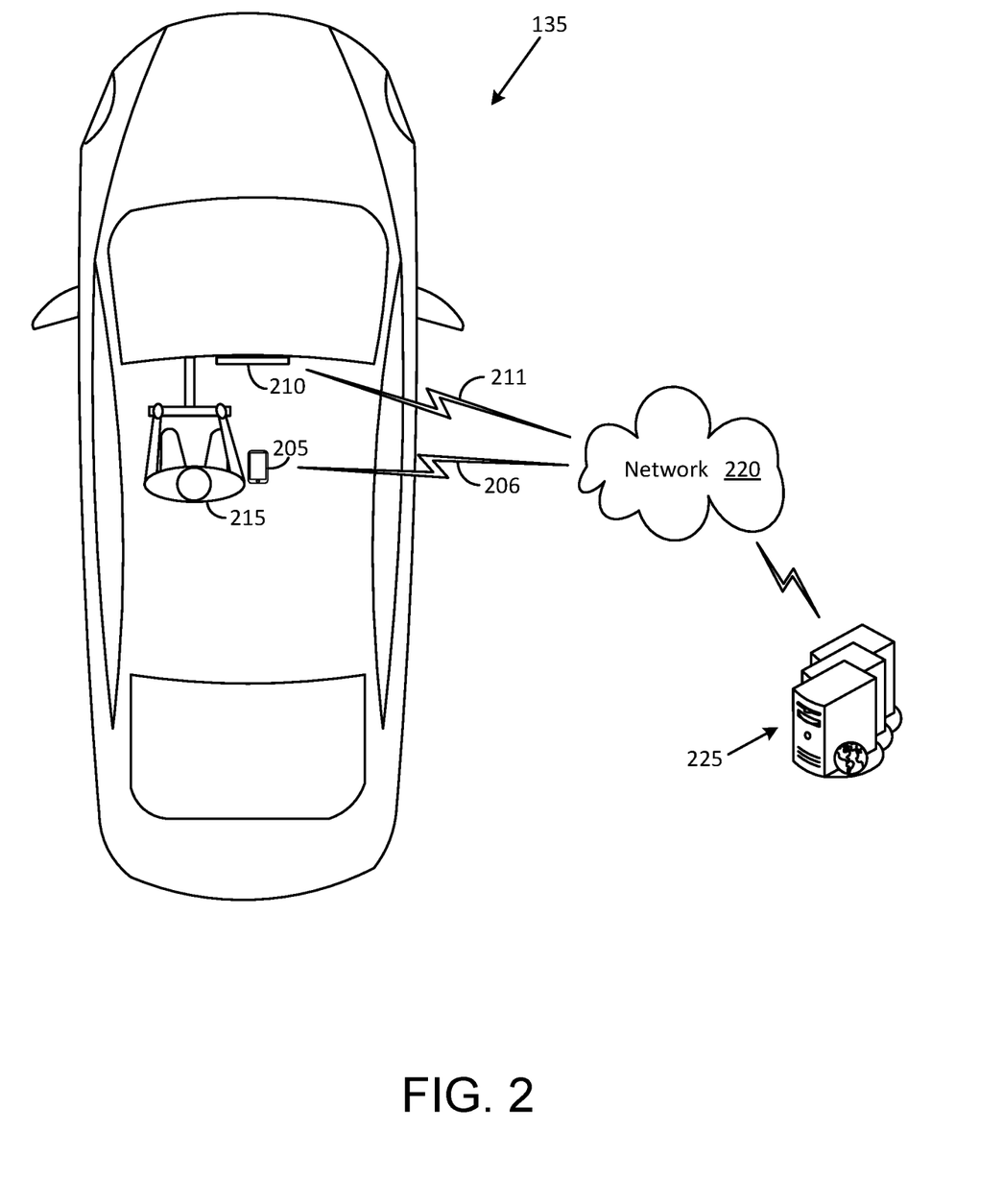
FIG. 2 illustrates some example components that may be used in accordance with the disclosure for detecting a vehicle traveling in a wrong direction on a road.

FIG. 2 illustrates some example components that may be used in accordance with the disclosure for detecting the vehicle 135 traveling in a wrong direction on the multi-lane road 105. The example components can include a smart device that is configured to wirelessly communicate with a server computer(s) 225 via a network 220.

The smart device can be a smartphone 205 that is carried by a driver 215 of the vehicle 135 (or by a passenger of the vehicle 135). The smartphone 205 can include a software application that performs various operations in accordance with the disclosure. In some cases, some of these operations may be carried out in cooperation with the server computer(s) 225. Towards this end, the smartphone 205 may utilize various types of wireless communication protocols to communicate with server computer(s) 225 via the network 220, as the vehicle 135 travels on the multi-lane road 105. For example, the smartphone 205 may use a cellular communication link 206 to communicatively couple to the network 220.

In some cases, the smartphone 205 may communicate with a single server computer when the distance traveled on the multi-lane road 105 is small, such as, for example, when the driver 215 travels to a neighborhood grocery store. The single server computer may execute various operations in accordance with the disclosure. In other cases, the smartphone 205 may communicate with multiple server computers when the distance traveled on the multi-lane road 105 is large, such as, for example, when the driver 215 travels through multiple states during a cross-country journey. The multiple server computers may be configured to cooperate with each other to execute various operations in accordance with the disclosure.

The network 220 may include any one or a combination of various networks such as a local area network (LAN), a wide area network (WAN), a telephone network, a cellular network, a cable network, a wireless network, and/or private/public networks such as the Internet.

The smart device can be an infotainment system 210 that is a part of the vehicle 135. The infotainment system 210 may be configured to cooperate with the smartphone 205 and/or the server computer(s) 225 to perform various operations in accordance with the disclosure. Towards this end, the infotainment system 210 can include a wireless transceiver (or be coupled to a wireless transceiver) that utilizes one or more of various types of wireless communication protocols to communicate with the smartphone 205 and/or server computer(s) 225. For example, the wireless transceiver may utilize Bluetooth® communication to communicate with the smartphone 205 and a vehicle-to-everything (V2X) communication to communicate with the server computer(s) 225 via the network 220 as the vehicle 135 travels on the multi-lane road 105.

Figure 3:
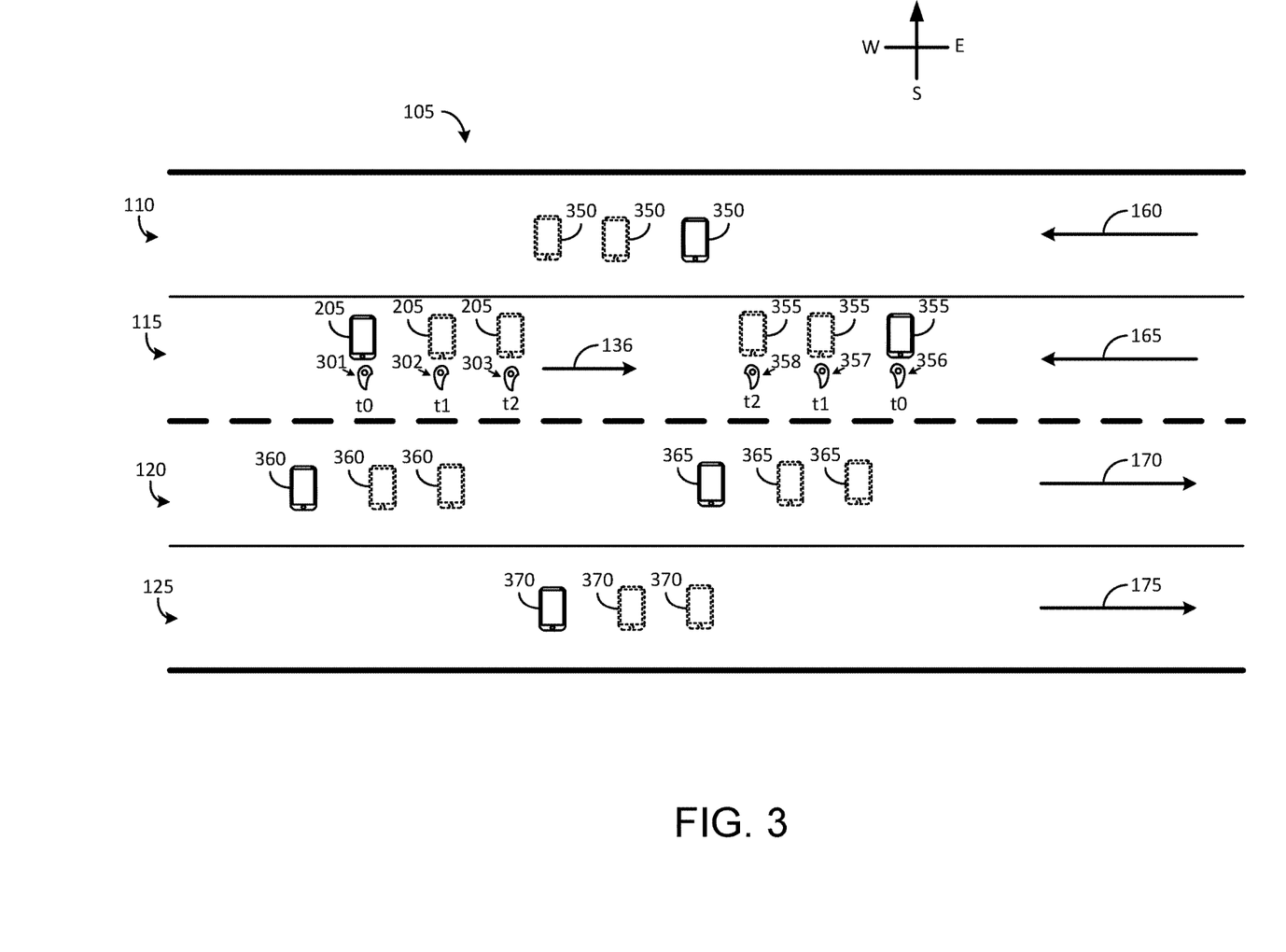
FIG. 3 illustrates an example scenario in which a smart device is used to detect the vehicle shown in FIG. 1 traveling in the wrong direction on the multi-lane road.

FIG. 3 illustrates an example scenario in which a smart device is used to detect the vehicle 135 traveling in the wrong direction in lane 115 of the multi-lane road 105. Various types of smart devices may be provided in the vehicle 135 for executing a wrong-way travel detection procedure in accordance with the disclosure. As depicted in FIG. 3, the smart device is the smartphone 205. In other implementations, a device such as the infotainment system 210 or a vehicle computer can be used in place of, or in addition to, the smartphone 205. The smartphone 205 can include a software application that executes the wrong-way travel detection procedure and also include a GPS system that provides location coordinates of the smartphone 205 at any given time.

The location coordinates of the smartphone 205 change in accordance with the movement of the vehicle 135 in which the smartphone 205 is located. For example, at time t0, the smartphone 205 provides a first location coordinate 301 that indicates a first position of the vehicle 135 on the multi-lane road 105. At time t1, the smartphone 205 provides a second location coordinate 302 that indicates a second position of the vehicle 135 on the multi-lane road 105. At time t2, the smartphone 205 provides a third location coordinate 303 that indicates a third position of the vehicle 135 on the multi-lane road 105, and so on. The various location coordinates are sequential in nature as the vehicle 135 moves in any given direction. Two or more of these sequential location coordinates may be used to identify the travel path 136 of the vehicle 135.

The software application provided in the smartphone 205 collects and utilizes the sequential location coordinates to determine the direction of travel of the vehicle 135 (west-to-east direction). The software application may access a database (for example, a database provided in the smartphone 205, or in a GPS system, or in the server computer(s) 225) to obtain information about the multi-lane road 105. The information may include various items such as, for example, various road rules applicable to the multi-lane road 105, a geographical map of the area surrounding the multi-lane road 105, a topographical map of the area, landmarks located near the multi-lane road 105, traffic information (congestion, accidents, etc.), and traffic light information (red light status, direction in which the traffic lights are facing, etc.). The road rules specifically provide information pertaining to a legitimate direction of travel for vehicles in each of the lanes.

In this example, the traffic rules indicate that the legitimate direction of travel for vehicles in lane 110 is east-to-west (arrow 160), the legitimate direction of travel for vehicles in lane 115 is east-to-west (arrow 165), the legitimate direction of travel for vehicles in lane 120 is west-to-east (arrow 170), and the legitimate direction of travel for vehicles in lane 125 is west-to-east (arrow 175). In other instances, the road rules can indicate legitimate directions of travel on various other travel surfaces such as, for example, a one-way road, a one-way street, a two-way road, or an off-road path.

The software application provided in the smartphone 205 may then use the information about the multi-lane road 105 that is obtained from the database to verify whether the direction of travel indicated by the two or more sequential location coordinates is a legitimate direction of travel for the vehicle 135. As illustrated in FIG. 3, application of the traffic rules to evaluate a travel path indicated by the sequential location coordinates (location coordinate 301, followed by location coordinate 302, followed by location coordinate 303, and so on) indicates that the vehicle 135 is traveling in a west-to-east direction, which is a wrong-way direction for travel in the lane 115.

The software application provided in the smartphone 205 is configured to propagate from the smartphone 205 to the server computer(s) 225 (via the network 220), the sequential location coordinates (location coordinate 301, followed by location coordinate 302, followed by location coordinate 303, and so on). In one implementation, the location coordinates may be propagated to the server computer(s) 225 in real-time as the vehicle is traveling on the multi-lane road 105. The server computer(s) 225 may accumulate the location coordinates and determine the direction of travel of the vehicle 135. In another implementation, the software application provided in the smartphone 205 is configured to collect a set of sequential location coordinates and propagate the set of sequential location coordinates to the server computer(s) 225 intermittently, or periodically. The server computer(s) 225 may process the set of sequential location coordinates, individually, or in conjunction with additional sets of sequential location coordinates, to determine the direction of travel of the vehicle 135. Either after, or before, determining the direction of travel of the vehicle 135, the server computer(s) 225 may access a database (provided in the server computer(s) 225, for example) to obtain information about the multi-lane road 105 and use the information to determine whether the vehicle 135 is traveling in the wrong direction on the multi-lane road 105.

The procedures described above that may be carried out by the software application in the smartphone 205 and/or by the server computer(s) 225 may be sufficient to make a determination whether the vehicle 135 is traveling in the wrong direction on the multi-lane road 105. However, in accordance with another embodiment of the disclosure, additional steps may be performed in order to double-check, or confirm, that the vehicle 135 is indeed traveling in the wrong direction.

A confirmation procedure in accordance with the disclosure, which can be executed by the software application in the smartphone 205 and/or by the server computer(s) 225, can include determining a direction of travel of one or more other vehicles on the multi-lane road 105. For example, the software application provided in another smartphone 355 that is located in the vehicle 140 can be used to determine sequential location coordinates of the vehicle 140 (location coordinate 356 at t0, location coordinate 357 at t1, location coordinate 358 at t2, and so on). These sequential location coordinates may be used by the software application in the smartphone 355 to determine a direction of travel of the vehicle 140, or propagated to the server computer(s) 225 for making the determination. The road rules applicable to the multi-lane road 105 may then be used to determine that the vehicle 140 is traveling in a legitimate direction (east-to-west) in lane 115 of the multi-lane road 105, which is opposite to the direction of travel of the vehicle 135 in the same lane, thus confirming that the vehicle 135 is traveling the wrong way.

Further confirmation, if so desired, may be obtained by using a smartphone 350 located in the vehicle 130 to determine that a direction of travel of the vehicle 130 in the lane 110 is opposite to the direction of travel of the vehicle 135, and/or by using a smartphone 360 located in the vehicle 145 to determine that a direction of travel of the vehicle 145 in lane 120 is identical to the direction of travel of the vehicle 135 in the lane 115.

If yet more confirmation is desired, a smart device such as a smartphone 365 located in the vehicle 155 may be further used to determine a direction of travel of the vehicle 155 in lane 120 and a smart device such as a smartphone 370 located in the vehicle 150 may be further used to determine a direction of travel of the vehicle 150 in lane 125.

Figure 4:
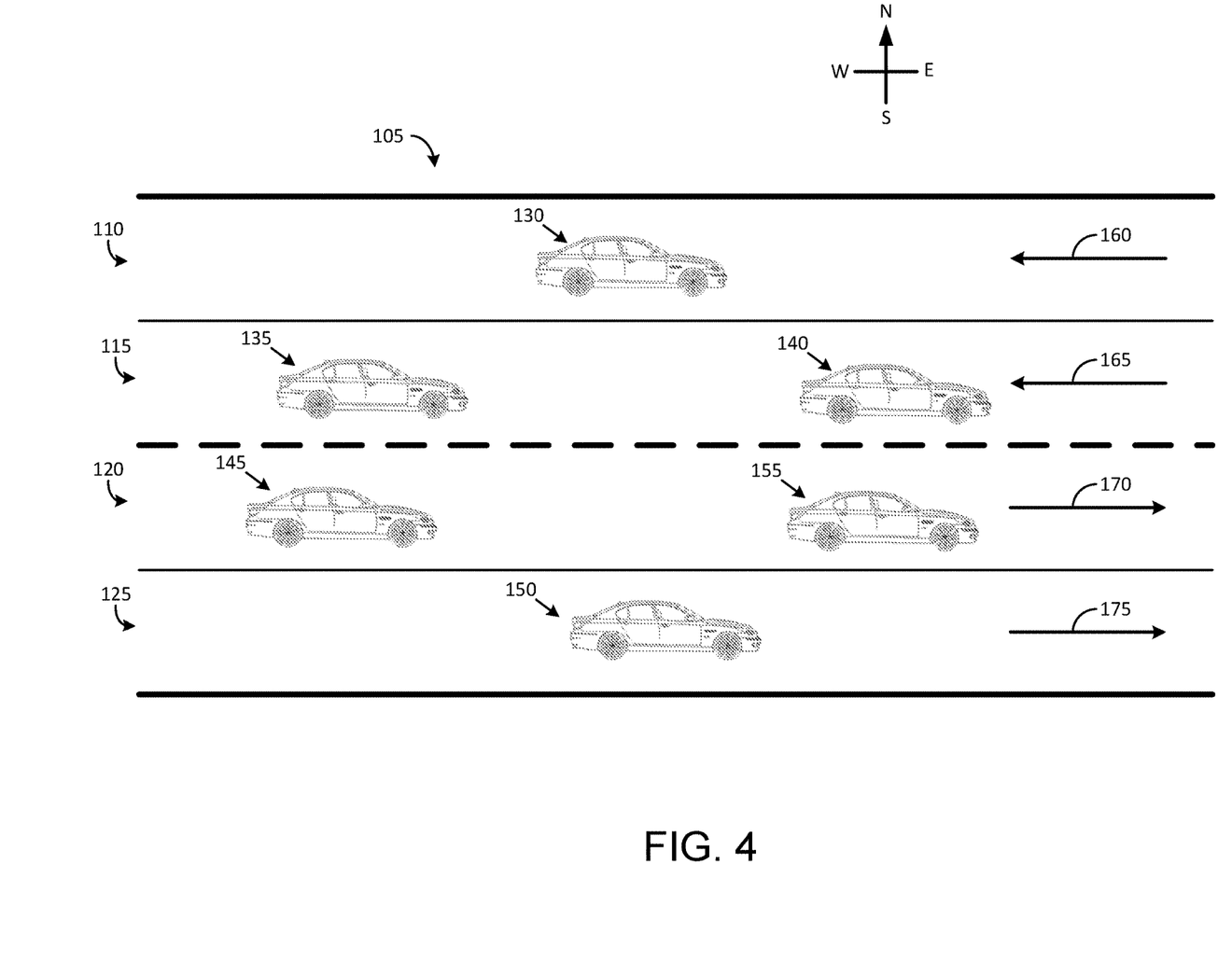
FIG. 4 illustrates another example scenario in which multiple vehicles are traveling in a wrong direction on a multi-lane road as a result of an unusual event.

FIG. 4 illustrates another example scenario in which multiple vehicles are traveling in a wrong direction on the multi-lane road 105, as a result of an unusual event. For example, law enforcement authorities may have designated multi-lane road 105 as an evacuation route for people to drive away from a natural calamity such as a hurricane or an earthquake that may have occurred in a city (not shown) at a westerly location. Accordingly, vehicles may be authorized to utilize all lanes of the multi-lane road 105 for traveling in a west-to-east direction.

Figure 5:
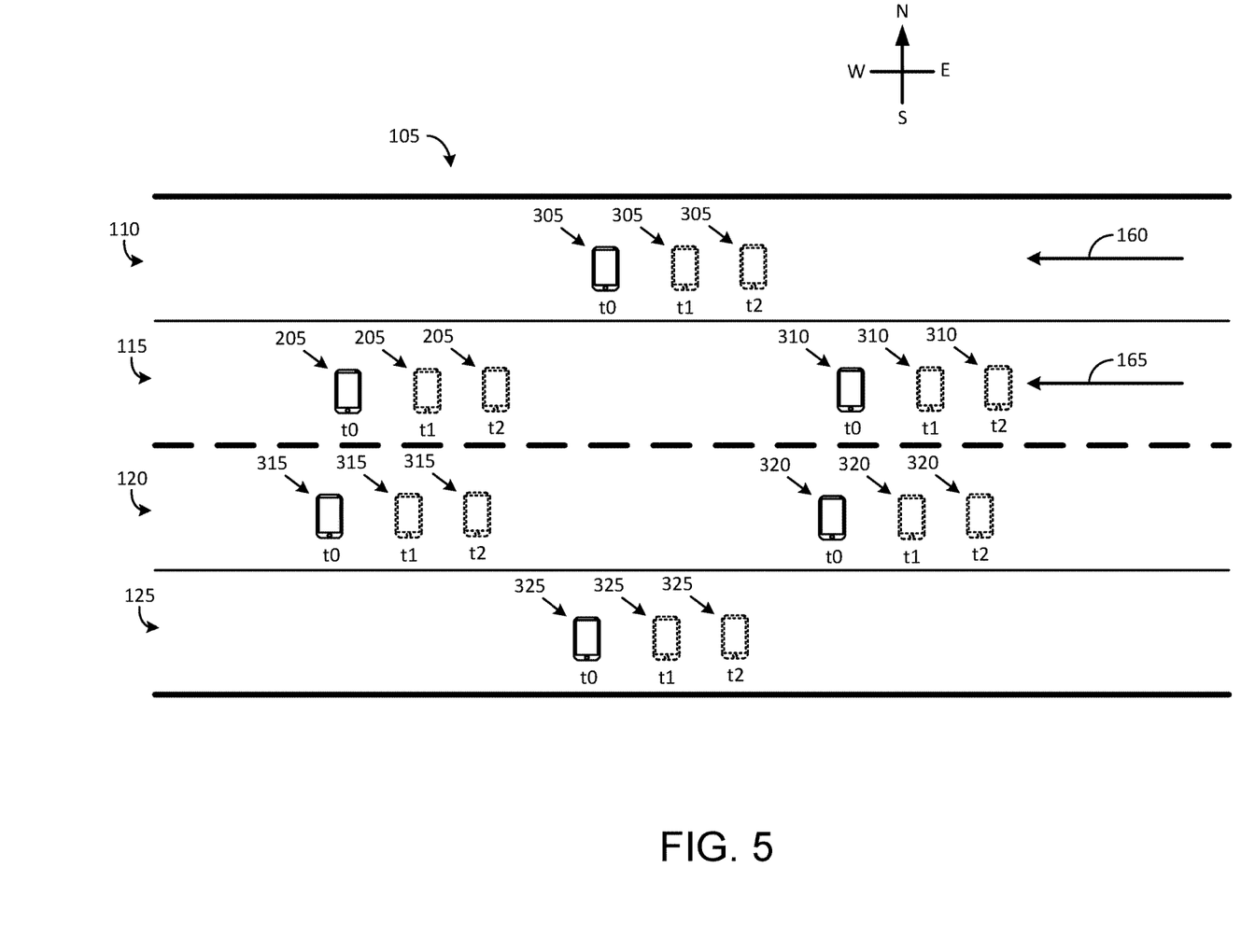
FIG. 5 illustrates an example scheme in which multiple smart devices may be used in accordance with the disclosure to detect multiple vehicles traveling in a wrong direction on a multi-lane road

FIG. 5 illustrates an example scheme in which multiple smart devices may be used in accordance with the disclosure to detect the multiple vehicles traveling in a wrong direction on the multi-lane road 105. Application of the traffic rules by the server computer(s) 225 to evaluate the travel path of the vehicle 135 that is indicated by the sequential location coordinates (location coordinate 301, followed by location coordinate 302, followed by location coordinate 303, and so on) indicates that the vehicle 135 is traveling in a west-to-east direction, which is a wrong-way direction for travel in the lane 115. An application of the confirmation procedure will reveal that the vehicle 140 is also traveling in the wrong direction (west-to-east direction) in lane 115, and that vehicle 130 is traveling in the wrong direction (west-to-east direction) in lane 110. Upon making such a determination that multiple vehicles are traveling in the wrong direction, the server computer(s) 225 may seek additional information from one or more sources such as for example, a weather bureau or a national news outlet. If the additional information provides a reason for the various vehicles traveling in the wrong direction (earthquake, hurricane, etc.), the server computer(s) may conclude that the wrong way driving of the vehicles in lane 110 and lane 115 is legally permissible.

Figure 6:
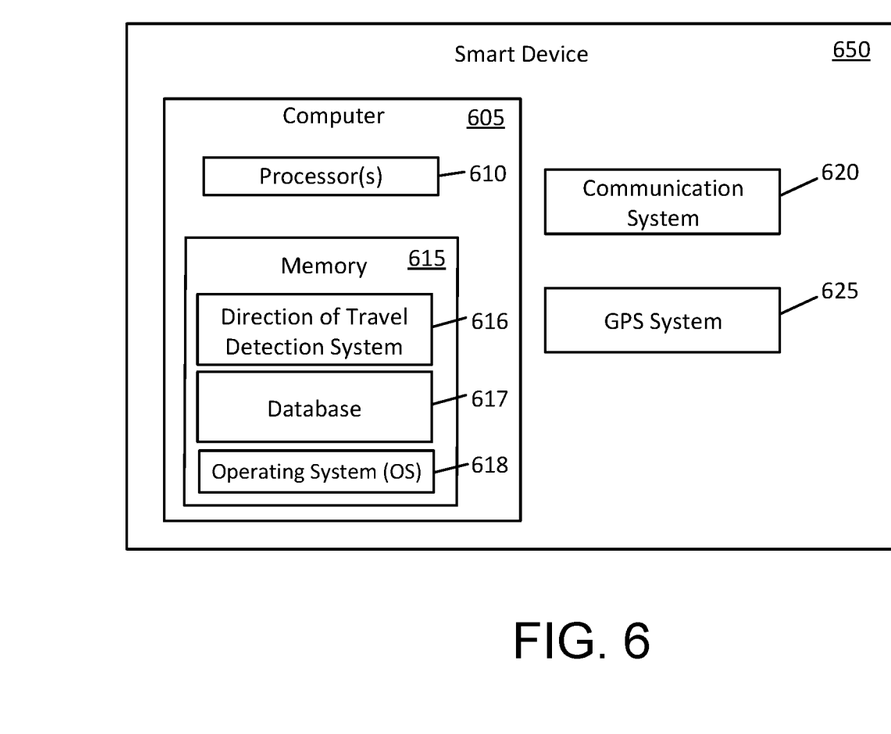
FIG. 6 shows some example components that can be a part of a smart device configured in accordance with the disclosure to detect a vehicle traveling in a wrong direction on a road.

FIG. 6 shows some example components that can be a part of a smart device 650 configured in accordance with the disclosure to detect a vehicle traveling in a wrong direction on a road. The smart device 650 can be any of various types of devices such as, for example, the smartphone 205 or the infotainment system 210 described herein. In some embodiments, the example components shown in FIG. 6 can be incorporated into the server computer(s) 225 and used to execute various operations in accordance with the disclosure.

The example components of the smart device 650 (and/or the server computer(s) 225) may include a communication system 620, a GPS system 625, and a computer 605. The communication system 620 can include one or more wireless transceivers such as, for example, a Bluetooth® low energy module (BLEM), a Wi-Fi transceiver, or a cellular transceiver. The BLEM allows the computer 605 to communicate with various components in the vehicle, such as, for example, the infotainment system 210 (when the smart device 650 is a smartphone). The Wi-Fi transceiver or cellular transceiver allows the computer 605 to communicate with components external to the vehicle, such as for example, the server computer(s) 225 (via the network 220).

The GPS system 625, which may be housed in the same enclosure as the computer 605 or in a different enclosure, is configured to provide location coordinates in the form of GPS coordinates, to the computer 605.

The computer 605 can include a processor(s) 610 and a memory 615. The memory 615, which is one example of a non-transitory computer-readable medium, may be used to store an operating system (OS) 618, a database 617, and various code modules such as a direction of travel detection system 616. The code modules are provided in the form of computer-executable instructions that can be executed by the processor 610 for performing various operations in accordance with the disclosure.

The direction of travel detection system 616, which can be a software application that is downloaded into a smartphone, may be executed by the processor 610 for performing various operations related to detecting one or more vehicles traveling in a wrong direction on a road. For example, the direction of travel detection system 616 may be executed by the processor(s) 610 to detect whether the vehicle 135 is traveling in the wrong direction on the multi-lane road 105 as described above.

The direction of travel detection system 616 may use artificial intelligence techniques to evaluate traffic for determining wrong way driving. The artificial intelligence techniques may include a learning mode of operation by which the direction of travel detection system 616 gathers and analyzes traffic data to glean information about normal driving patterns and/or abnormal driving patterns.

The database 617 is an optional element that may be omitted in the smart device 650 and located in other devices such as, for example, the server computer(s) 225. When included, the database 617 can be used to store items such as, for example, road rules applicable to the multi-lane road 105.

The memory 615 can include any one memory element or a combination of volatile memory elements (e.g., random access memory (RAM, such as DRAM, SRAM, SDRAM, etc.)) and non-volatile memory elements (e.g., ROM, hard drive, tape, CD ROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

In the context of software, the operations described herein with respect to computers, such as the computer 605, may be implemented by computer-executable instructions stored on one or more non-transitory computer-readable media such as the memory 615, that, when executed by one or more processors such as the processor 610, perform the recited operations. Generally, computer-executable instructions include routines, programs, objects, components, data structures, and the like that perform particular functions or implement particular abstract data types.

Figure 7:
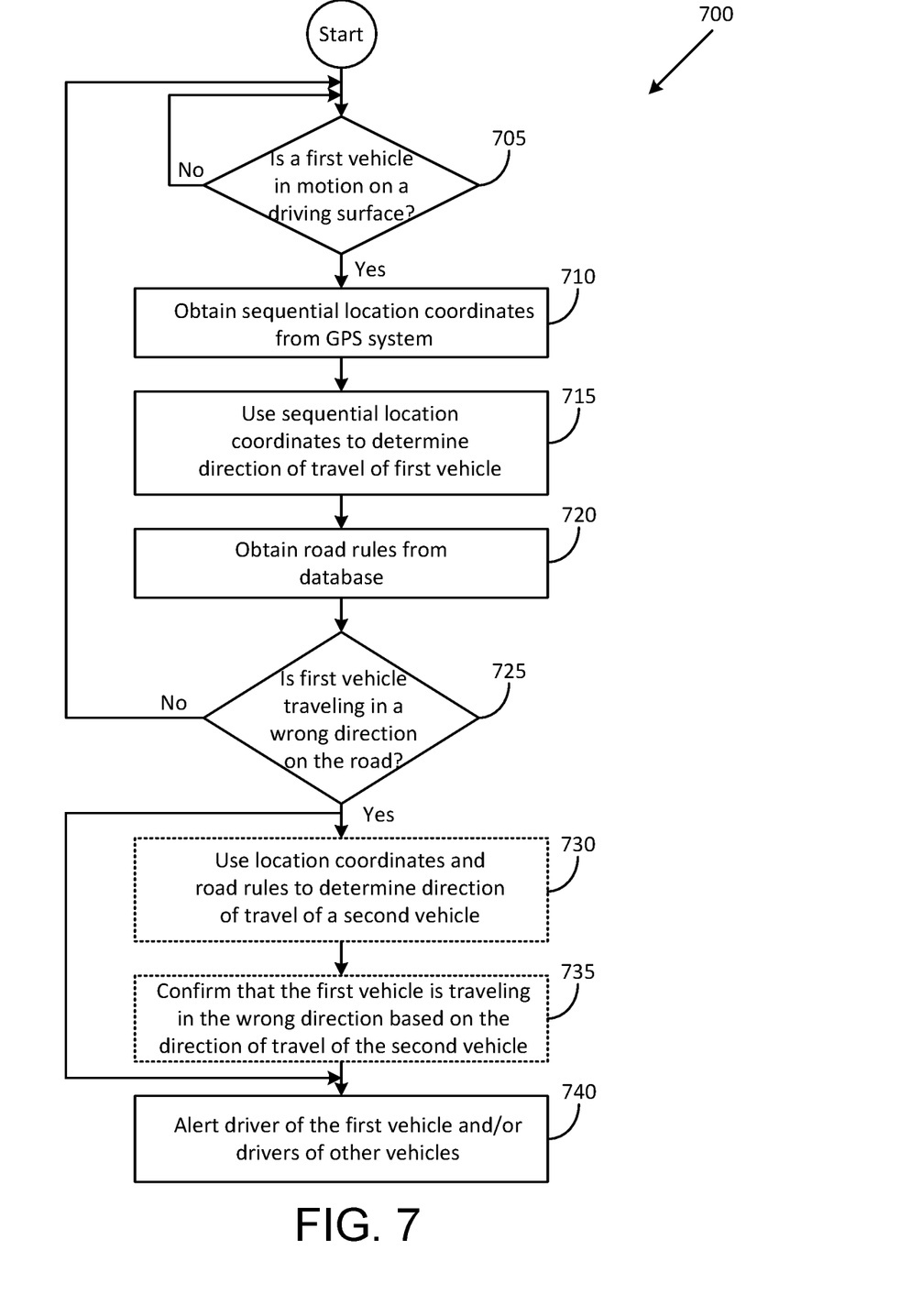
FIG. 7 shows a flowchart of an example method in accordance with the disclosure for detecting a vehicle traveling in a wrong direction on a road.

FIG. 7 shows a flowchart 700 of an example method in accordance with the disclosure for detecting a vehicle traveling in a wrong direction on a road. The flowchart 700 illustrates a sequence of operations that can be implemented in hardware, software, or a combination thereof. In the context of software, the operations represent computer-executable instructions stored on one or more non-transitory computer-readable media such as the memory 615, that, when executed by one or more processors such as the processor 610, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 700 may be carried out by the smartphone 205, the infotainment system 210, and/or the server computer(s) 225. The description below may make reference to certain components and objects shown in FIGS. 1-6, but it should be understood that this is done for purposes of explaining certain aspects of the disclosure and that the description is equally applicable to many other embodiments.

At block 705, a determination is made whether a vehicle, such as the vehicle 135, is in motion on a driving surface such as the example multi-lane road 105 described above. In one example implementation, the determination may be made by use of a threshold speed parameter, such as, for example, a lower speed limit that is applicable to the vehicle 135 when moving on the multi-lane road 105. The determination is executed recursively if the vehicle 135 is stationary. On the other hand, if the vehicle 135 is in motion, at block 710, two or more sequential location coordinates may be obtained from a GPS system located in the vehicle 135. At block 715, road rules may be obtained from a database. The road rules may indicate that the direction of travel in each of the lane 110 and the lane 115 of the multi-lane road 105 is west-to-east and is east-to-west on each of the lane 120 and the lane 125.

At block 720, the sequential location coordinates and the road rules may be used to determine if the vehicle 135 is traveling in a wrong direction on the multi-lane road 105. If the vehicle 135 is traveling in a legitimate direction (east-to-west) in the lane 115, action returns to block 705. However, if the vehicle 135 is traveling in the wrong direction (as illustrated in FIG. 1), at block 740, various responsive actions may be taken.

For example, if the determination at block 725 is performed by the smartphone 205, the smartphone 205 may emit an audible signal to alert the owner of the smartphone 205 (driver 215, for example) of the wrong-way travel. The smartphone 205 may also communicate with the infotainment system 210 to cause the infotainment system 210 to provide visual and/or audible alerts to the driver 215 and other occupants of the vehicle 135. The smartphone 205 may further communicate with the server computer(s) 225 to inform the server computer(s) 225 of the wrong-way travel of the vehicle 135. The server computer(s) 225 may then alert drivers of other vehicles such as, for example, a driver of the vehicle 140, about the wrong-way driving. The alert can be provided in some cases via a billboard display on the multi-lane road 105.

If the determination at block 725 is performed by the server computer(s) 225, the server computer(s) 225 may communicate with the smartphone 205 to alert the owner of the smartphone 205 (driver 215, for example) of the wrong-way travel. The server computer(s) 225 may also communicate with the infotainment system 210 and/or the vehicle computer to cause the infotainment system 210 to provide visual and/or audible alerts to the driver 215 and other occupants of the vehicle 135. When the vehicle 135 is an autonomous vehicle, a vehicle computer of the autonomous vehicle may respond to the alert from the server computer(s) 225 by performing actions such as changing a direction of movement of the vehicle 135, or stopping the vehicle 135 in a safe manner. The server computer(s) 225 may alert drivers of other vehicles such as, for example, a driver of the vehicle 140, about the wrong-way driving of the vehicle 135. The alert can be provided in some cases via a billboard display on the multi-lane road 105.

In some cases, the determination made at block 725 of the wrong-way travel of the vehicle 135 may be confirmed by performing actions indicated in block 730 and block 735. At block 730, sequential location coordinates and the road rules may be used to determine a direction of travel of another vehicle, such as, for example, the vehicle 140. At block 735, a confirmation may be made that the vehicle 135 is traveling in the wrong direction (west-to-east) upon determining that the vehicle 140 is traveling in a legitimate direction (east-to-west) in lane 115.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" and a "bus" is defined as one or more data links that enable the transport of electronic data between computer systems and/or modules and/or other electronic devices. When information is transferred or provided over a network, a bus, or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced using various devices including in-dash vehicle computers, personal computers, desktop computers, laptop computers, message processors, handheld devices, multi-processor systems, microprocessor-based or programmable consumer electronics, network PCs, mini-computers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   receiving, by a processor coupled to memory, two sequential location coordinates of a first smart device in a first vehicle that is traveling on a road;
   determining, by the processor and based on the two sequential location coordinates of the first vehicle, a direction of travel of the first vehicle on the road;
   obtaining, by the processor, a road rule that is applicable to the road from a first database;
   determining, based on the road rule and the direction of travel, that the first vehicle is traveling in a wrong direction on the road;
   receiving, by the processor, two sequential location coordinates of a second smart device in a second vehicle traveling on the road;
   determining, by the processor and based on the two sequential location coordinates of the second vehicle, a direction of travel of the second vehicle on the road; and
   confirming, by the processor, that the first vehicle is traveling in the wrong direction on the road based on the direction of travel of the second vehicle being determined to be opposite to the direction of travel of the first vehicle.

2. The method of claim 1, wherein the first smart device is a smartphone carried by an occupant of the first vehicle, and wherein each of the two sequential location coordinates are GPS coordinates determined by a GPS system provided in the smartphone.

3. The method of claim 1, wherein the first smart device is an infotainment device provided in the first vehicle, and wherein each of the two sequential location coordinates are GPS coordinates determined by a GPS system that is a part of the infotainment device.

4. The method of claim 1, wherein the road is a multi-lane road having more than one direction of travel and the road rule provides information about a legitimate direction of travel for vehicles in each of multiple lanes of the multi-lane road.

5. The method of claim 1, further comprising:
   determining, by the processor, that the direction of travel of the second vehicle is identical to the direction of travel of the first vehicle; and
   determining, by the processor and based on the road rule, that both the first vehicle and the second vehicle are traveling in the wrong direction on the road.

6. The method of claim 5, wherein both the first vehicle and the second vehicle are traveling in the wrong direction on the road due to a natural calamity.

7. A method comprising:
   providing in a first vehicle, a first smart device comprising a first GPS system;
   utilizing, by the first smart device, the first GPS system, to determine a direction of travel of the first vehicle on a road;
   utilizing, by the first smart device, a database to identify one or more road rules that are applicable to the road;
   utilizing, by the first smart device, the one or more road rules to determine whether the first vehicle is traveling in a wrong direction on the road;
   propagating to a server computer, by the first smart device, the direction of travel of the first vehicle on the road;
   providing in a second vehicle, a second smart device comprising a second GPS system;
   utilizing, by the second smart device, the second GPS system, to determine a direction of travel of the second vehicle on the road;
   propagating to the server computer, the direction of travel of the second vehicle on the road;
   determining, by the at least one server computer, that the direction of travel of the second vehicle is identical to the direction of travel of the first vehicle; and confirming, by the at least one server computer, that the first vehicle is traveling in the wrong direction on the road based on the direction of travel of the second vehicle being determined to be opposite to the direction of travel of the first vehicle.

8. The method of claim 7, wherein the first smart device is a smartphone carried by an occupant of the first vehicle.

9. The method of claim 7, wherein the first smart device is an infotainment device provided in the first vehicle.

10. The method of claim 7, wherein the road is a multi-lane road having more than one direction of travel and the one or more road rules provide information about a legitimate direction of travel for vehicles in each of multiple lanes of the multi-lane road.

11. The method of claim 7, further comprising: detecting, by the at least one server computer, based on the one or more road rules, that both the first vehicle and the second vehicle are traveling in the wrong direction on the road when the direction of travel of the second vehicle is identical to the direction of travel of the first vehicle.

12. The method of claim 11, wherein both the first vehicle and the second vehicle are traveling in the wrong direction on the road due to a natural calamity.

13. A first smart device provided in a first vehicle, the first smart device comprising:
a GPS system;
a memory that stores computer-executable instructions; and
a processor configured to access the memory and execute the computer-executable instructions to at least:
determine, based on the GPS system, a direction of travel of the first vehicle on a road;
identify, based on the GPS system, one or more road rules that are applicable to the road; and
determine, based on the one or more road rules, whether the first vehicle is traveling in a wrong direction on the road;
receive two sequential location coordinates of a second smart device in a second vehicle traveling on the road;
determine, based on the two sequential location coordinates of the second vehicle, a direction of travel of the second vehicle on the road; and
confirm that the first vehicle is traveling in the wrong direction on the road based on the direction of travel of the second vehicle being determined to be opposite to the direction of travel of the first vehicle.

14. The smart device of claim 13, wherein the road is a multi-lane road having more than one direction of travel and the one or more road rules provide information about a legitimate direction of travel for vehicles in each of multiple lanes of the multi-lane road.

15. The smart device of claim 13, wherein the direction of travel of the first vehicle on the road is determined based on two sequential GPS location coordinates of the first vehicle when the vehicle is traveling on the road.

16. The smart device of claim 13, wherein the computer-executable instructions stored in the memory comprise a software application that is loaded into the smart device.

17. The smart device of claim 13, further comprising:
a warning indicator that provides a warning to a driver of the vehicle when the vehicle is traveling in the wrong direction on the road.

18. The smart device of claim 13, wherein the first smart device is a smartphone carried by an occupant of the first vehicle.

* * * * *